(12) United States Patent
Hultmark et al.

(10) Patent No.: US 11,825,205 B2
(45) Date of Patent: Nov. 21, 2023

(54) COMPUTER IMPLEMENTED METHOD AND A SYSTEM FOR OBTAINING A CAMERA SETTING

(71) Applicant: PROFOTO AKTIEBOLAG, Sundbyberg (SE)

(72) Inventors: Marcus Hultmark, Järfälla (SE); Emanuel Schütt, Farsta (SE); Anton Falk, Huddinge (SE)

(73) Assignee: PROFOTO AKTIEBOLAG, Sundbyberg (SE)

( * ) Notice: Subject to any disclaimer, the term of this patent is extended or adjusted under 35 U.S.C. 154(b) by 3 days.

(21) Appl. No.: 17/596,407

(22) PCT Filed: May 26, 2020

(86) PCT No.: PCT/SE2020/050532
§ 371 (c)(1),
(2) Date: Dec. 9, 2021

(87) PCT Pub. No.: WO2020/251444
PCT Pub. Date: Dec. 17, 2020

(65) Prior Publication Data
US 2022/0239820 A1    Jul. 28, 2022

(30) Foreign Application Priority Data

Jun. 13, 2019  (SE) .................... 1950702-9
Nov. 11, 2019  (SE) .................... 1951299-5

(51) Int. Cl.
*H04N 23/73*    (2023.01)
*H04N 23/56*    (2023.01)
*H04N 23/63*    (2023.01)

(52) U.S. Cl.
CPC ............. *H04N 23/73* (2023.01); *H04N 23/56* (2023.01); *H04N 23/633* (2023.01)

(58) Field of Classification Search
None
See application file for complete search history.

(56) References Cited

U.S. PATENT DOCUMENTS

2008/0106636 A1    5/2008    Wenersson
2008/0298794 A1    12/2008   Subbotin et al.
(Continued)

FOREIGN PATENT DOCUMENTS

WO    WO 00/64147 A1    10/2000

OTHER PUBLICATIONS

International Search Report and Written Opinion of the International Searching Authority for International Application No. PCT/SE2020/050532, dated Sep. 4, 2020, in 14 pages.

*Primary Examiner* — Cynthia Segura
(74) *Attorney, Agent, or Firm* — Knobbe, Martens, Olson & Bear, LLP

(57) ABSTRACT

The present disclosure relates to a computer implemented method and system for obtaining an image sensor exposure setting for use in capturing an image using a main flash. The method comprises the steps of obtaining first pre-image data related to a first pre-image captured using a predetermined first image sensor pre-image exposure setting, wherein the first pre-image is captured while emitting a flash of a predetermined first pre-flash energy; obtaining second pre-image data related to a second pre-image captured using a predetermined second image sensor pre-image exposure setting, wherein the second pre-image is captured while emitting a flash of a predetermined second pre-flash energy different than the first pre-flash energy; determining a flash effected area in the second pre-image in which a predetermined ratio of the image sensor pixel values have changed from the first pre-image; and determining the image sensor exposure setting for use in capturing the image based on the first and the second set of image senor pixel values in the (Continued)

flash affected area, the predetermined first and second image sensor pre-image exposure setting and a relation between a predetermined main flash energy, the energy of the predetermined first pre-flash and the energy of the predetermined second pre-flash, respectively.

19 Claims, 5 Drawing Sheets

(56) References Cited

U.S. PATENT DOCUMENTS

| | | |
|---|---|---|
| 2009/0160944 A1 | 6/2009 | Trevelyan et al. |
| 2010/0060728 A1* | 3/2010 | Bublitz .................. G03B 15/03 |
| | | 348/78 |
| 2014/0178059 A1 | 6/2014 | Miyazaki |
| 2014/0285709 A1 | 9/2014 | Guo et al. |
| 2016/0088278 A1 | 3/2016 | Velarde et al. |
| 2022/0053121 A1* | 2/2022 | Falk ....................... H04N 23/62 |

* cited by examiner

Fig 1
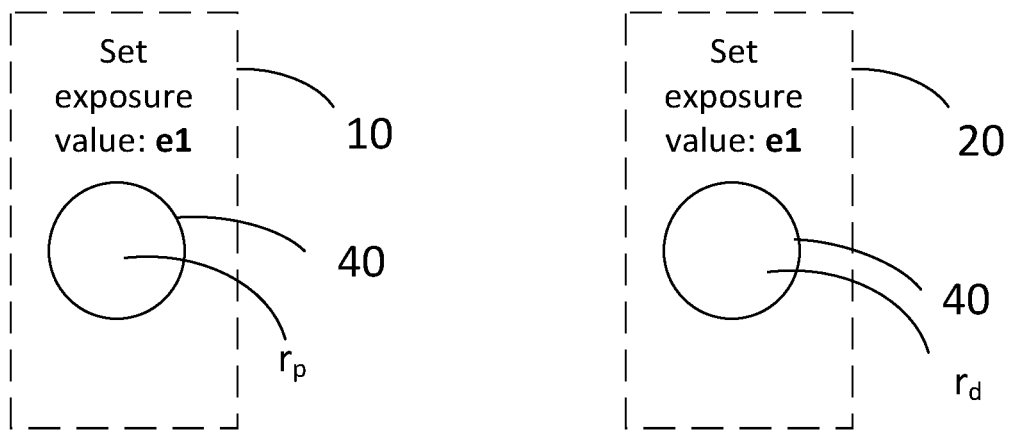
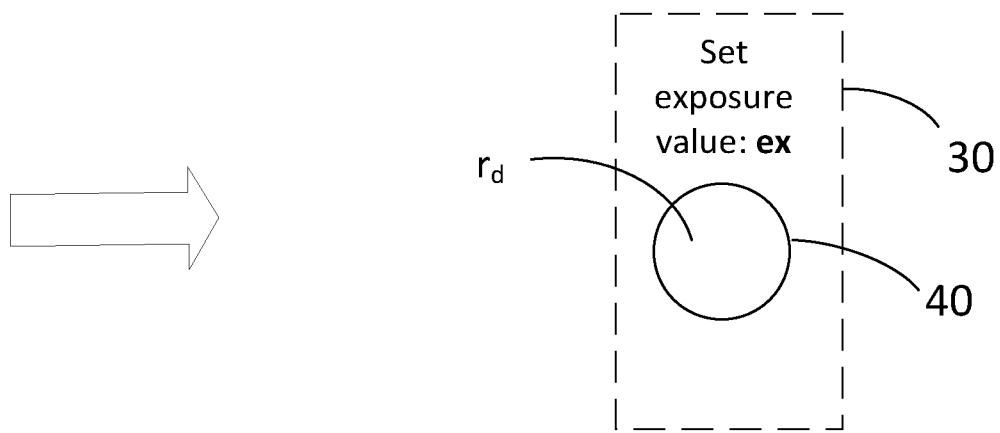
Fig 2
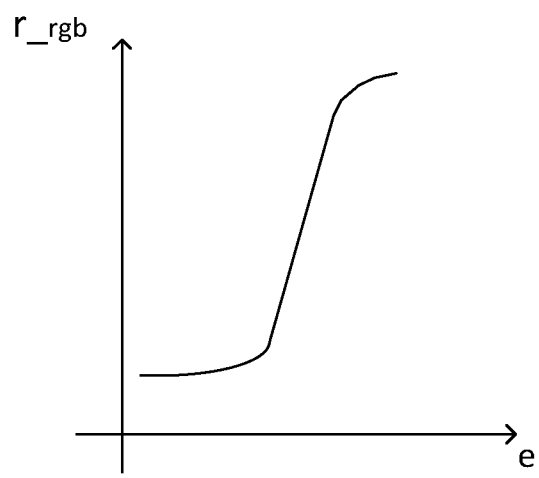

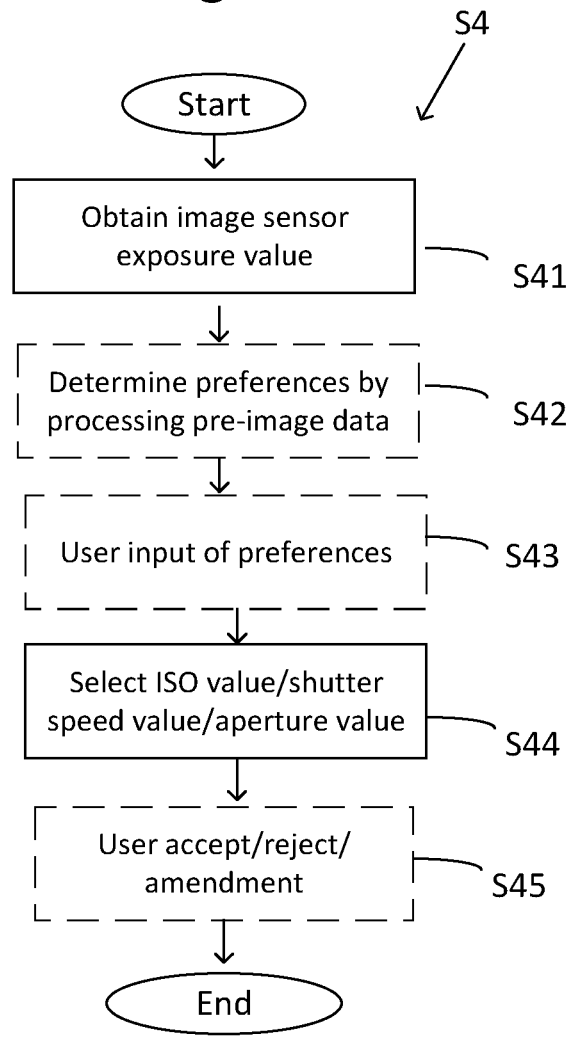
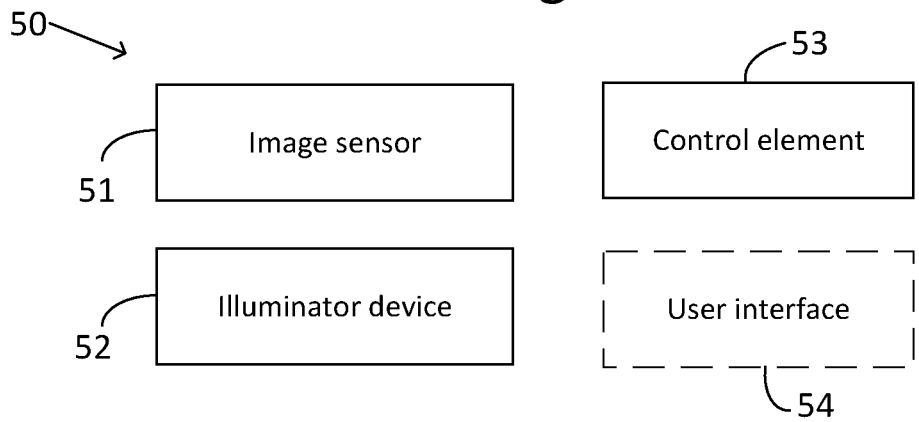

Legend
61: Image Sensor
65: App

Legend
71: Image sensor
73: Communication interface

COMPUTER IMPLEMENTED METHOD AND A SYSTEM FOR OBTAINING A CAMERA SETTING

CROSS-REFERENCE TO RELATED APPLICATIONS

This application is the U.S. National Phase under 35 U.S.C. § 371 of International Application PCT/SE2020/050532, filed May 26, 2020, which claims priority to SE Application No. 1950702-9, filed Jun. 13, 2019, and SE Application No. 1951299-5, filed Nov. 11, 2019, the entire contents of each of which are incorporated by reference herein and made a part of this specification.

TECHNICAL FIELD

The present invention relates to photographing and particularly to obtaining an image sensor setting for use when taking a picture of a scene.

BACKGROUND

Within the art of photography, an aim of the photographer is characteristically to improve photographs taken.

When it is desired to provide additional light to a scene to be photographed, an illumination device may be used to provide additional light to the scene, to thereby improve the illumination of the scene and thereby the quality of the pictures taken thereof. It is in the art known to find a suitable flash power of an illumination device to obtain desired lightning conditions when taking the picture. This may be achieved by use of a pre-flash. The scene is then lightened using the pre-flash and data sensed by the camera while lightening the scene with light from the pre-flash is evaluated. A picture is then taken while the scene is lightened with light from a main flash having an energy level determined based on the evaluation. Further, more than one illumination device may be used to further enable improving the lightning conditions. In this case the illumination from the more than one illumination devices are superimposed for both the pre-flash and the main flash.

US 2014/0285709 discloses a method based on use of pre-flash statistics for controlling image capture. A statistics engine analyses image data to determine first image capture statistics and second image capture statistics, wherein the first image capture statistics is obtained while a strobe is not emitting light and the second image capture statistics is obtained while a preflash is being emitted. First main flash control statistics is then determined based at least in part on the first and second image capture statistics and the second image capture statistics. Third image capture statistics is then gathered based on a first main flash frame of image data. Thereafter, second main flash control statistics are determined based at least on part on the second main flash control statistics and an image is captured based on the second main flash control statistics.

SUMMARY

An object of the invention is to provide alternative control for image capture based on use of pre-flashes.

This object has been achieved by means of a computer-implemented method as defined in claim 1.

The flash energy of the pre-flash(es) and the main flash relates characteristically to the amount of light in the flash.

In using the above method, image sensor exposure setting for use when capturing an image is quickly obtained. The data needed for the method is the first and second sets of image sensor pixel values and information relating to the predetermined first and second image sensor pre-image exposure setting, the predetermined main flash energy and the energy of the predetermined first pre-flash and possible predetermined second pre-flash, respectively. Thus, the method is relying on use of a known and a pre-determined camera exposure setting used in capturing sets of image sensor pixel values and a known and predetermined amount of light in light flashes used for illuminating the scene when capturing the sets of image sensor pixel values, for determining the image sensor exposure setting. The use of known image sensor exposure settings, pre-flash energy when capturing the sets of image sensor pixel values and main flash energy, as defined herein, has the effect that the time required for determining the image sensor exposure setting corresponds to the time it takes for capturing the first and second pre-images and processing thereof. This makes the method fast.

In accordance with the claimed method, the image sensor exposure setting is determined to obtain a desired exposure in the flash affected area of the image as detected by the image sensor. Thus, efficient exposure control is obtained by taking into account only those parts of the image affected by the flash.

Further, the amount of flash light necessary for determining the image sensor exposure settings is limited to the amount of light in the first and potential second predetermined pre-flash used in capturing the pre-images. Thus, the method is energy efficient.

In photography, exposure is the amount of light per unit area, i.e. the image plane illuminance times the exposure time, reaching a photographic film or electronic image sensor, as determined by shutter speed, lens aperture and scene luminance. Exposure is characteristically measured in lux seconds, and can be computed from exposure value (EV) (herein denoted exposure setting) and scene luminance in a specified region.

The flash is a brief, sudden burst of light. The flash has characteristically a short extension in time, typically shorter than a second. The use of a flash is less intrusive compared to illuminating with a constant light. Also, a flash allows energy efficient illumination with bright light as it only illuminates during a short time.

The first or second pre-flash energy is preferably zero.

The desired exposure may be determined based on the pre-image data captured without emitting a flash.

Characteristically, the main flash energy is higher than the pre-flash energy/energies.

The predetermined first image sensor pre-image exposure value may be equal to the predetermined second image sensor pre-image exposure value.

The desired exposure of the image may relate to an average pixel value of the flash affected area.

The computer implemented method further comprises a step of determining whether a predetermined ratio of the pixel values of the first and/or second set of image sensor pixel values are within a predetermined range. When not, the obtaining of the first and/or pre-image data is repeated until a first and/or second set of image sensor pixel values is obtained wherein the predetermined ratio of the pixel values are within the predetermined range, or until it is determined that the predetermined range is insufficient for the predetermined ratio of sensor pixel values. The repeating is performed with adjusted first/second pre-flash energy and/or first/second pre-image exposure setting. The step of determining the image sensor exposure setting is then made based on first and/or second data sets wherein the predetermined ratio of the pixel values are within the predetermined range.

When it is determined that the predetermined range is insufficient, a plurality of pre-images with different exposure settings may be used for forming a combined image, wherein the first set of image sensor pixel values in the combined image is a combination of the image sensor pixel values from different first pre-images.

When it is determined that the predetermined range is insufficient, a plurality of pre-images with different exposure settings may be used for forming a combined image, wherein the second set of image sensor pixel values in the combined image is a combination of the image sensor pixel values from different second pre-images.

The repeating may be performed until the first set of image sensor pixel values are within the predetermined range, wherein the first set of image sensor pixel values are obtained based on a plurality of obtained first pre-image data. The repeating may be performed until the second set of image sensor pixel values are within the predetermined range, wherein the second set of image sensor pixel values are obtained based on a plurality of obtained second pre-image data.

Alternatively, when it is determined that the predetermined range is insufficient for one of the sets, the pixel values of the other set may be used for estimating correct values for those image sensor values which lie outside the predetermined range. Thus, the characteristics of the pre-image are estimated. For example a histogram over the number of pixels for each intensity value relating to the other set may be used for estimating correct values for those image sensor values which lie outside the predetermined range. The estimation is based on the assumption that the histograms for both sets have the same shape. Also other information relating to the characteristics of the captured scene can be used in estimating correct values for those image sensor values which lie outside the predetermined range. For example, a relation between the predetermined first pre-flash energy and the pre-determined second pre-flash energy may be used for estimating the correct values.

The determination of the image sensor exposure setting may comprise selecting a sensor sensitivity value and/or a shutter speed value and/or an aperture size for the image sensor for use when capturing the image.

The selection of a sensor sensitivity value and/or a shutter speed value and/or an aperture size may be based on stored data, said stored data relating for a predetermined number of image sensor exposure settings each image sensor exposure setting to at least one corresponding sensor sensitivity value and shutter speed value pair, and wherein the selection of a sensor sensitivity value and/or a shutter speed value comprises selecting a pair related to the determined image sensor exposure setting. Thus, in this example it is assumed that the aperture size is pre-set.

The selection of a sensor sensitivity value/shutter speed value pair may be made automatically or manually by the user. The selection may be based on the type of image to be captured, for example based on the extent of movements within the captured scene or the extent of movements within the identified areas of interest within the captured scene.

The computer implemented method may further comprise a step of applying the determined image sensor exposure setting or information related thereto to image sensor control.

The computer implemented method may further comprise a step of determining at least one area of interest in the image. The determination of at least one area of interest in the image may be based on face recognition in the first or second pre-image and/or based on user selection of an area of interest. The user selection of an area of interest may for example be made in a live stream visible in the camera before initiation of image capture. The area of interest is characteristically smaller than the image. The flash affected area then is obtained in the area of interest.

The present disclosure further relates to a computer program arranged to, when executed perform the method for obtaining an image sensor exposure setting for use in capturing an image using a main flash, as disclosed herein.

The present disclosure further relates to a control element for controlling an image sensor exposure setting according to claim 14.

The control element is characteristically arranged to forward information relating to the determined image sensor exposure setting to the image sensor for image sensor control.

The control element may be arranged to receive information relating to the predetermined first and second image sensor pre-image exposure value from the image sensor.

The control element may further be arranged to control a flash power/energy and/or flash duration of the flashes.

The control element may be implemented in an app.

The present disclosure further relates to a system for image capture control. The system comprises an image sensor, at least one illumination device, and a control element as defined herein arranged to provide image sensor exposure setting information to the image sensor.

In one option, the image sensor is comprised in a portable electronic camera device, such as camera phone or tablet, which portable electronic camera device may be arranged to communicate with the at least one remote illumination device via short range communication interface such as a Bluetooth interface and/or a Wi-Fi interface.

In one option, the image sensor is comprised in a portable electronic camera device, wherein the portable electronic camera device further comprises a communication interface configured to communicate with a remote illumination device configured to emit a flash to illuminate the scene for capture by the image sensor. The portable electronic camera device is configured to control the remote illumination device, and the portable electronic camera device further comprises the control element of the present disclosure arranged to provide image sensor exposure setting information to the image sensor.

In one option, the system is at least partly implemented in a portable electronic camera device comprising the image sensor to capture an image of a scene and the illumination device configured to emit a flash to illuminate the scene for capture by the image sensor.

BRIEF DESCRIPTION OF THE DRAWINGS

FIG. 1 illustrates schematically a principle for use of pre-image data to obtain an image sensor setting for use in capturing an image FIG. 2 is a graph illustrating the linearity of an exemplary image sensor.

FIG. 4 is a flow chart illustrating examples of a step for obtaining the image sensor exposure setting in a method as illustrated in FIG. 3.

FIG. 5 is a block scheme illustrating an example of a system for image capture control.

DETAILED DESCRIPTION

Figure 3:
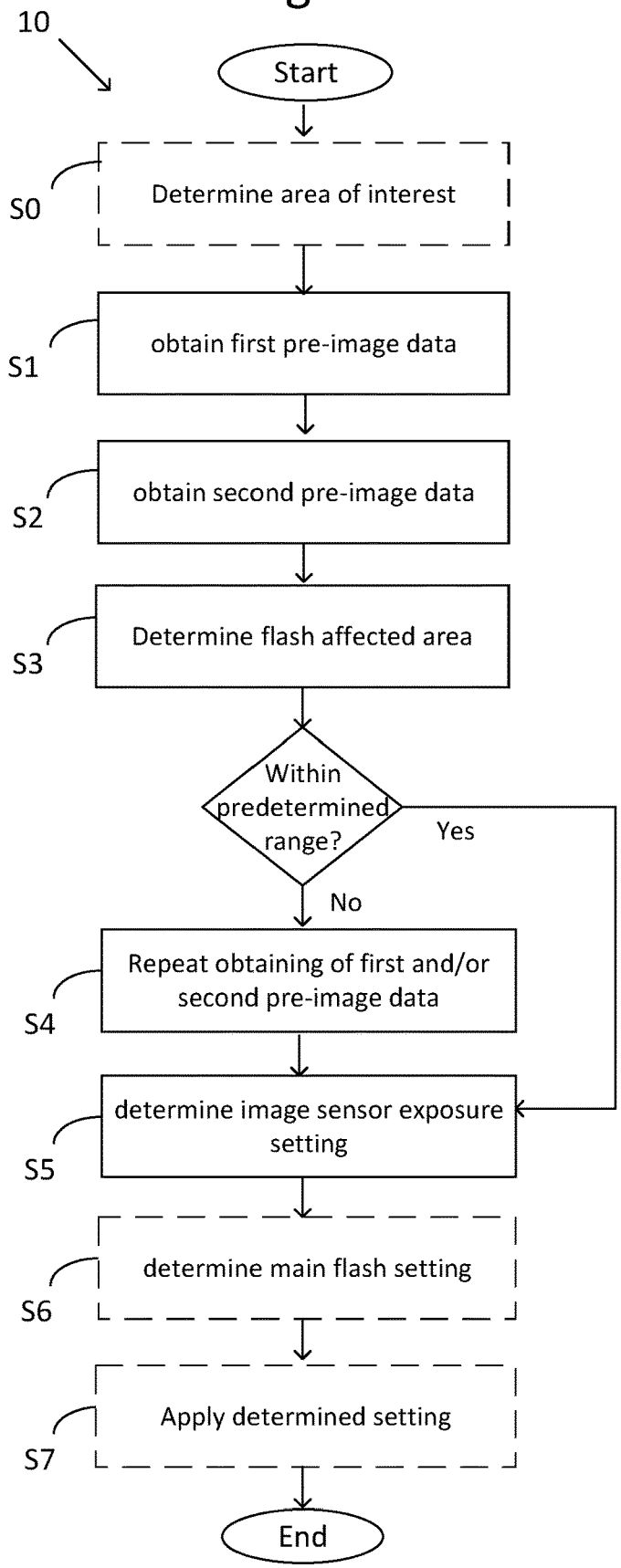
FIG. 3 is a flow chart illustrating examples of a method for obtaining an image sensor exposure setting for use in capturing an image using a main flash pulse.

In FIG. 1, the principles of a method for obtaining an image sensor exposure setting for use in capturing an image 30 is illustrated.

The image sensor exposure depends on different factors. The image sensor exposure depends on shutter speed, aperture and sensor sensitivity. The sensor sensitivity is usually within the technical field denoted ISO. ISO simply stands for the International Organization of Standardization, which is the main governing body that standardizes sensitivity ratings for camera sensors, among many other things, setting may relate to one or a combination of parameters. Note that different camera manufacturers follow different standards for how ISO is measured.

For example, the image sensor exposure setting may relate to a shutter speed. The image sensor exposure setting may relate also to an ISO value. With both analogue and digital cameras, ISO refers to the same quantity: the light sensitivity of either the film or image sensor. When the light sensitivity on a digital camera is changed, the sensor is rendered more or less sensitive to light. One of the greatest features of digital cameras is their ability to change light sensitivity on the fly. This is in contradiction to the analogue cameras using film, in which case whatever film speed was loaded into the camera will be used, at least until that particular film roll has been finished.

Thus, the camera exposure depends on shutter speed, aperture and ISO (light sensitivity). The shutter speed of the image sensor is normally settable. The aperture image sensor may be settable. As stated above, in digital cameras the ISO (light sensitivity) of the image sensor is characteristically settable. Thus, the obtained camera exposure settings may relate to shutter speed and/or aperture and/or ISO (light sensitivity).

A first pre-image 10, or first pre-image data related to the first pre-image is obtained. The first pre-flash data comprises a first set of image sensor pixel values. The first pre-image is captured while emitting a flash of a predetermined first pre-flash energy. The flash affects at least a part 40 of the first pre-image.

The first image 10 is captured using a first predetermined image sensor pre-image exposure setting e1. As is clear from the above, the first predetermined image sensor pre-image exposure setting e1 depends on shutter speed, aperture and ISO. In the examples herein the aperture is constant while the shutter speed and ISO is variable.

Further, a second pre-image 20, or first pre-image data related to the second pre-image is obtained. The second pre-flash data comprises a second set of image sensor pixel values. The second pre-image 20 may be obtained using a predetermined second image sensor pre-image exposure value having a known relation to the predetermined first image sensor pre-image exposure value. However, calculations and image sensor control is simplified if the image sensor image sensor exposure settings are the same when capturing the first and second pre-images.

The second pre-image is preferably captured without emitting a flash. However, the second pre-image may instead be captured using a predetermined second flash energy, wherein the predetermined second flash energy is different than the first predetermine flash energy.

Then, the image sensor exposure setting ex for use in capturing the image 30 is determined based on the first and the second pre-image data, the predetermined image sensor pre-image exposure value related to each pre-image e1 and a relation between a predetermined main flash energy and the energy of the predetermined first pre-flash and possible predetermined second pre-flash, respectively. In detail, a flash affected area 40 is determined based om the first pre-image data and the second pre-image data, wherein in the flash affected area 40 a predetermined ratio of the image sensor pixel values in the second image have changed from the first pre-image. In an option wherein the second pre-image data is captured without emitting a flash, the determination of the flash affected area 40 may comprise determining at least one part of the first pre-image in which the pre-image data is affected by the first pre-flash based on a comparison between the first and second pre-image data.

The principles in determining the image sensor exposure setting for use in capturing the image are illustrated by way of example below.

In accordance with this example, we define the image sensor exposure setting e as:

$$e = \text{shutter speed} * \text{ISO}.$$

The aperture is in accordance with this example regarded as not being settable. Thus the aperture has been removed from the calculations. Thus, the image sensor operates according to set shutter speed and ISO values to capture an image. In different image sensor set-ups, both the shutter speed and the ISO value may be adaptable or one of them.

The definition of the image sensor exposure setting e as a product of the shutter speed and the ISO value is an example. The image sensor exposure value may be defined in other ways. However, characteristically, as explained herein the image sensor exposure value varies with varying ISO values and with varying shutter speed values.

The image sensor exposure setting ex is determined to obtain a desired exposure in the image. Exposure is the amount of light per unit area, i.e. the image plane illuminance times the exposure time, reaching a photographic film or electronic image sensor, as determined by shutter speed, lens aperture and scene luminance. Exposure is characteristically measured in lux seconds, and can be computed from exposure value (EV) (herein denoted exposure setting) and scene luminance in a specified region. The exposure may be obtained on a pixel-by-pixel level.

We herein determine exposure H as $$H = e * E,$$

wherein, as discussed above e represents the exposure setting and wherein E is the flux.

Described in relation to the example of FIG. 1, the exposure $H_d$ of the second pre-image in the illustrated example captured without use of the pre-flash may be denoted $$H_d = e_1 * E_d \quad (1)$$

wherein the index d indicates that the data relates to a dark picture, i.e. data obtained without the scene being lightened using a flash. However, the data may instead be obtained while the scene is illuminated with a flash having the second predetermined pre-flash energy, different than the first pre-flash energy.

Further, the exposure $H_p$ of the first pre-image captured with a pre-flash with the predetermined first pre-flash energy may be denoted $$H_p = e_1(E_d + E_p) \quad (2)$$

The index p indicates that data is obtained while the scene is illuminated with a flash. $E_d$ denotes the flux without a pre-flash and $E_p$ denotes the flux added from the pre-flash.

The contribution of the flux from the first pre-flash can, based on the above equations (1) and (2) be written as $$E_p = \frac{H_p - H_d}{e_1} \quad (3)$$

Then, the image sensor exposure setting for use in capturing the image is determined to obtain a desired exposure $H_x$ of the image to be captured. In one example, we assume that a desired exposure $H_x$ of the image to be captured corresponds to the exposure $H_d$ of the dark image. Thus, in accordance with this example we assume that $$H_x = H_d \quad (4)$$

This means that $$H_x = H_d = e_x(E_x + E_d), \quad (5)$$

wherein $e_x$ is the exposure value of the image to be captured corresponding to the desired exposure $H_x$.

Thus, the exposure value $e_x$ is now calculated to obtain the desirable exposure $H_x$ of the image to be captured. Principles for calculating the exposure value $e_x$ may be described as follows.

The f-stop of an optical system, such as a camera lens, is characteristically defined as the ratio of the system's focal length to the diameter of the entrance pupil. Thus, the f-stop is a dimensionless number N that is a quantitative measure of lens speed. The f-stop defines the reciprocal of the relative aperture. The f-stop is an important concept in photography.

The f-stop N may be given by:

$$N = \frac{f}{D} \quad (6)$$

Ignoring differences in light transmission efficiency, a lens with a greater f-stop value projects darker images. The brightness of the projected image (exposure) relative to the brightness of the scene in the lens's field of view (luminance) decreases with the square of the f-number. Doubling the f-number decreases the relative brightness by a factor of four. To maintain the same photographic exposure when doubling the f-stop value, the exposure time would need to be four times as long.

A light quantity from a pre-flash may be defined in relation to the main flash wherein the main flash is set at a maximum level as:

max−$a*(f$-stop), or in light of the reasoning above as $2^{max-a}$

Therefore, the flux for the image to be captured may be written as $$E_x = E_p * 2^a \quad (7)$$

Further, the exposure for the image to be captured may be written as $$H_x = H_d = e_x(E_p + E_d), \quad (8)$$

Thus, $$H_d = e_1 E_d = e_x E_p (2^a + E_d) \quad (9)$$

In other words, $$e_x = \frac{e_1 E_d}{E_p 2^a + E_d} \quad (10)$$

Thus, $$e_x = \frac{e_1 H_d}{(H_p - H_d) 2^a + H_d} \quad (11)$$

As stated above, in accordance with these equations, it is assumed that the desired exposure $H_x$ of the image to be captured corresponds to the exposure $H_d$ of the dark image. However, this is only an example, other desired exposures can be used and the equations (4) and (8)-(11) above will be adapted accordingly. For example, the desired exposure $H_x$ of the image to be captured can be determined based on user input. The user input may indicate a desired exposure. The indicated desired exposure may relate to an area of interest or flash affected area. Different desired exposures in different parts of the image/area of interest/flash affected area may be indicated by the user. The user input may indicate the area of interest in the image.

Further, the equations above are made based on the assumption that the pre-flash is emitted constantly during the entire exposure time. Thus, it is assumed that the mean value of the flux is constant over the entire exposure. However, the equations may be adapted for the situation wherein the flux is varying over the exposure time. For example, the flash light may be emitted during only a part of the exposure time.

Now, the pixel values of the image sensor used are denoted $r_{rgb}$ The pixel values for the respective pixel of the image sensor may for example be denoted $r_d$ for pixel values relating the data relating to the second pre-image without a pre-flash and $r_p$ for pixel values relating to the data relating to the first pre-image captured while the scene is lightened using a pre-flash.

Now, we are looking at an average value for the pixel values of the respective image. Thus, an average pixel value for the data relating to the dark picture may be denoted $\tilde{r}_d$ while the average pixel value for the picture captured while the scene being lightened with the pre-flash may be denoted $\tilde{r}_p$. The pixel values relating to the respective pixel of the image sensor exhibits at least in part of the range a linear behaviour.

When the pixel values of the image sensor are within the linear range, the respective average pixel values $\tilde{r}_p$, and $\tilde{r}_d$ form a representation, or approximation of the exposures with pre-flash and without pre-flash.

Thus, average pixel values $\tilde{r}_p$, and $\tilde{r}_d$, respectively may be used for the exposures $H_d$ and $H_p$, respectively in equation (11) above. Thereby, the image sensor exposure setting is determined.

In accordance with the above, the respective average pixel exposure values $\tilde{r}_p$, and $\tilde{r}_d$, respectively may be determined and used for the exposures $H_d$ and $H_p$, respectively in equation (11) for the flash affected area 40. Then, parts of the images which are not affected by the flash will not be taken into consideration in determining the image sensor exposure setting.

The pixel values $r_d$, $r_p$ for the respective pixel of the image sensor used in determining the average image sensor pixel values $\tilde{r}_p$, and $\tilde{r}_d$ may be evaluated before forming the respective pixel average value. For example, image sensor pixel values lying outside the linear range of the image sensor may be disregarded when forming the average image sensor pixel value. Further, it may be determined based on the image sensor pixel values whether the energy level of the pre-flash should be adapted in order to increase the possibility of obtaining image sensor pixel values lying within the linear range of the sensor. Then, new first pre-image data may be obtained while the scene is lightened with a pre-flash of a predetermined new energy level. Different examples for evaluation of image sensor pixel values will be described more in detail later in this description.

The linearity of the sensor and thus the range suitable to use for forming an approximation of the exposure is dependent on the characteristics of the sensor.

FIG. 2 illustrates an example of the linearity of an image sensor and thus the range suitable to use for forming an approximation of the exposure. In the illustrate example the x axis represents image sensor exposure values and the y axis represents average pixel values.

In FIG. 3, a flow chart illustrates examples of implementation of a method for obtaining an image sensor exposure setting for use in capturing an image using a main flash pulse or sequence of pulses. The method uses at least some of the principles set in in the description in relation to FIG. 1.

The computer-implemented method comprises a step of obtaining S1 first pre-image data related to a first pre-image captured with the image sensor using a predetermined first pre-image exposure setting, wherein the first pre-image is captured while emitting a flash of a predetermined first pre-flash energy. The first pre-flash energy represents the amount of light emitted in the pre-flash. The first pre-flash may be emitted during the whole time while the shutter is open for capturing the first pre-image or the first pre-flash may be emitted as a peak during capture of the first pre-image. The first pre-image comprises a first set of image sensor pixel values.

The computer method comprise further a step of obtaining S2 second pre-image data related to a second pre-image captured with the image sensor using a predetermined second pre-image exposure value. The predetermined second image sensor pre-image exposure value has a known and predetermined relation to the predetermined first image sensor pre-image exposure value. The predetermined second image sensor pre-image exposure value may equal the first predetermined image sensor pre-image exposure value. The second pre-image is captured while emitting a flash of a predetermined second pre-flash energy or without emitting a flash. The second pre-flash has a different energy than the first pre-flash. When the second pre-image is captured while emitting a pre-flash of predetermined second pre-flash energy, the second pre-flash may otherwise have the same characteristics as the first pre-flash. The second pre-image comprises a second set of image sensor pixel values.

The steps S1, S2 of obtaining first and second pre-image data may be performed in different order.

The computer implemented method comprises further a step of determining S3 at least one flash affected area in the based on the first and second pre-image data. The flash affected area is an area in which a predetermined ratio of the sensor pixel values have changed in the second pre-image data in relation to the first pre-image data. The flash affected area may for example be an area in which 90-100% of the sensor pixel values have changed in the second pre-image data in relation to the first pre-image data. In order to detect a change in a pixel value, the change in the pixel value has characteristically to exceed a predetermined value. Thereby, false detection of a flash in a pixel is avoided in situations when there are fluctuations in the pixel values for example due to noise etc.

Thus, the determination S3 of the at least one flash affected area comprises determining at least one part of the first pre-image in which the pre-image data is affected by the first pre-flash based on a comparison between the first and second pre-image data.

The computer-implemented method comprises further a step of determining S5 the image sensor exposure setting for use in capturing the image based on the first and the second set of image senor pixel values in the flash affected area, the predetermined first and second image sensor pre-image exposure setting and a relation between a predetermined main flash energy, the energy of the predetermined first pre-flash and the energy of the predetermined second pre-flash, respectively, so as to obtain a desired exposure of the flash affected area of the image.

The main flash energy is in different examples higher than the pre-flash energy(-ies).

The image sensor exposure setting is determined so as to obtain the desired exposure in at least some of the flash affected areas in the image. In relation to FIG. 1, examples for determining the image sensor exposure settings are described.

The image sensor exposure setting comprises determining the image sensor exposure setting so as to obtain a desired exposure of the image. The desired exposure of the image may relate to an average pixel value of the image. The desired exposure may be determined based on the second pre-image data captured without emitting a flash.

A main flash setting may also be determined S6. For example, the main flash setting may be determined so that the main flash is emitted during the whole time while the shutter is open. In another example, the main flash setting is determined so that the main flash is emitted during a part of the time while the shutter is open. The main flash may for example be emitted as a peak during capture of the image. Note for example that at lower shutter speeds, the shutter may be fully open during capture of the image, revealing the entire imagining sensor to light. At higher shutter speeds, opening and closing of the shutter may be performed simultaneously; thus the entire image sensor may not be revealed for light simultaneously. The main flash settings may be selected to cope with this so that the flash is captured by the entire image sensor even in the latter situation. At lower shutter speeds on the other hand, wherein the entire image sensor is revealed simultaneously, it may be desired to have a flash emitted as a peak. Further, a setting for the main flash energy may also be determined.

The computer implementing method may further comprise a step of applying S7 the determined image sensor exposure setting or information related thereto to the image sensor for image sensor control. In this step, determined main flash setting may also be applied to an illumination device for light flash control.

The computer implemented method may further comprise a step of determining whether a predetermined ratio of the pixel values of the first and/or second set of image sensor pixel values are within a predetermined range, and when not, repeating S4 the obtaining of the first and/or pre-image data until a first and/or second set of image sensor pixel values is obtained wherein the predetermined ratio of the pixel values are within the predetermined range, or until it is determined that the predetermined range is insufficient for the predetermined ratio of sensor pixel values. The repeating may be performed with adjusted first/second pre-flash energy and/or first/second pre-image exposure setting, The step of determining S5 the image sensor exposure setting is made based on first and/or second data sets wherein the predetermined ratio of the pixel values are within the predetermined range. The predetermined range may be selected as a linear range of the image sensor. When the pixel values are within the linear range of the image sensor, less complex algorithms for determining the image sensor exposure settings, such as those disclosed in relation to FIG. 1, may be used.

The obtaining of the first and/or pre-image data may be repeated until a predetermined ratio of the image sensor pixel values of the flash affected areas are within the predetermined range. The obtaining of the first and/or pre-image data may be repeated until a predetermined ratio of the image sensor values of the entire first and second sets of image sensor pixel values are within the predetermined range.

In order to obtain first and second sets of image sensor pixel values, wherein a predetermined ratio of the image sensor pixel values of the flash affected areas or the entire sets are with the predetermined range, the following may be performed. The first set of image sensor pixel values may be obtained based on a combination of a plurality of obtained first pre-image data. This means that pixel values may be selected from different versions of the first pre-image data sets to obtain a combined first set of image sensor pixel values. Each image sensor pixel value of the combined first set may then be associated to the pre-flash energy and/or pre-image exposure setting relating to that pixel. The second set of image sensor pixel values may be obtained based on a combination of a plurality of obtained second pre-image data. This means that pixel values may be selected from different versions of the second pre-image data sets to obtain a combined second set of image sensor pixel values. Each image sensor pixel value of the combined second set may then be associated to the pre-flash energy and/or pre-image exposure setting relating to that pixel.

In different examples, when it is determined that the predetermined range is insufficient, a plurality of first pre-images with different exposure values are used for a combined image, wherein the first set of image sensor pixel values in the combined image is a combination of the image sensor pixel values from different first pre-images.

In different examples, the repeating S4 is performed until the second set of image sensor pixel values are within the predetermined range, wherein the second set of image sensor pixel values are obtained based on a plurality of obtained second pre-image data.

The step of determining S5 the image sensor exposure setting is then made based on the combined first and second data sets. The image sensor exposure setting may then be determined S5 based on the pre-flash energy and/or pre-image exposure setting relating to the respective pixel value.

In the illustrated example, the obtaining of the first and/or second pre-image data is repeated S4 until an acceptable first and/or second set of image sensor pixel values is obtained after the flash affected area(s) has been determined. This is because it is possible to determine the flash affected area(s) as long as a difference between the first and second sets of image sensor pixel values can be established. The actual values no not need to be accurate in order to be able to determine the flash affected area(s). The repeating S4 of the obtaining of the first and/or pre-image data may of course instead be performed before determining the flash affected area.

In different embodiments instead of, or in addition to repeating S4 the first and/or second pre-image data, when it is determined that the predetermined ratio of the pixel values of one of the first and second sets of image sensor pixel values are not within a predetermined range, the pixel values of the other set may be used to estimate correct values for those image sensor values which lie outside the predetermined range. For example, a histogram over the number of pixels for each intensity value relating to the other set may be used for estimating correct values for those image sensor values which lie outside the predetermined range. The estimation is made based on the assumption that the histograms for both sets have the same shape. Also other information relating to the characteristics of the captured scene can be used in estimating correct values for those image sensor values which lie outside the predetermined range. For example, a relation between the predetermined first pre-flash energy and the pre-determined second pre-flash energy may be taken into account when estimating the correct values.

In the illustrated example, the method comprises an initial step of determining S0 at least one area of interest in the image to be captured. The determination of the area of interest may be based on face recognition. A face recognition functionality may be implemented in the image sensor or software associated thereto arranged to process image data, such as the first and/or second pre-image data.

The determination S0 of at least one area of interest in the image to be captured may be based on user selection. Thus, the user may for example mark areas of interest on a touchscreen image display.

The areas of interest may be formed from a combination of the above, i.e. area(s) identified from face recognition and area(s) obtained through user input.

When having determined S0 an area of interest, the flash affected area(s) may be determined S3 within said area(s) of interest.

In FIG. 4, examples of further steps for determining s4 the image sensor exposure setting is illustrated. The image sensor exposure setting is obtained S41, which has been determined as disclosed herein. The image sensor exposure setting depends, as also discussed herein, on different factors. The image sensor exposure setting depends on shutter speed, aperture and ISO. At least one of those is variable. In different examples, the ISO value is variable. In different examples, the shutters speed is instead or in addition thereto variable. In different examples, the aperture is instead or in addition thereto variable. Thus, a combination of shutter speed, aperture and ISO values may be selected S44 corresponding to the obtained image sensor exposure setting. These selected values may then be applied to the imagining sensor for use when capturing the image.

In an example, the aperture is considered not variable and the ISO value and/or a shutter speed value is selected S44 to obtain the imagining sensor exposure setting. This selection may be made based on stored data, said stored data relating, for a predetermined number of imagining sensor exposure settings, each image sensor exposure setting to at least one corresponding ISO value and shutter speed value pair. The selection of an ISO value and/or a shutter speed value comprises then selecting a pair related to the determined image sensor exposure setting. When a plurality of pairs are available corresponding to a given image sensor exposure setting, a selection of pair can be made either automatically or via user selection via a user interface, such as a touch-screen display.

As a thumb rule, a lower ISO makes the image less noisy and produces better colour and dynamic range, i.e. the ability of the image sensor to capture detail in both high-lights and shadows. Therefore, it is generally recommended to keep ISO as low as possible in order to get the highest quality output from the image sensor. Nonetheless, there are times when it will not be possible to get a proper exposure without increasing the ISO. This includes low-light scenarios, especially indoors. Other situations where high ISO is desired when action is captured. This would require a fast shutter speed. Yet other situations where high ISO is desired are when capturing an image having a deep depth of field. This would characteristically require a small aperture.

Thus, the following are examples of parameters which characteristically would affect the selection of ISO/shutter speed and potentially aperture speed.

Movement of objects in the scene
Whether a large depth of field is required
Whether the image sensor is stable, for example by means of a tripod
Amount of light flash used
Ambient light
Whether the image is intended to be displayed in a large or small format For example, the user may be able to via user interface indicate S43 information/preferences relating to the at least one of the above parameters, and a suitable ISO/shutter speed pair may be selected based thereon.

The preferences relating to some or all of the parameters may be determined S42 by the system itself. For example, the pre-image data for a plurality of images may be obtained and the movement in the scene may be determined based on identification of moving objects in the pre-images. Information relating to whether a large depth of field is required may also be obtained based on processing of at least one pre-image to identify objects, such as faces, mountains etc., in the pre-image. For example, if the image sensor is connected to an inertial sensor, such as a gyro, the system may be determine whether the image sensor is stable based signals for the inertial sensor. Further, ambient light conditions can be determined for example from the first or second pre-image data captured without emitting a flash. At least those preferences not determined by the system itself may be obtained via the user interface.

In an example, the system may suggest an ISO/shutter speed pair based on at least one user input or system determined preference. This suggestion may be accepted/rejected/amended by the user via the user interface. Alternatively, the ISO/shutter speed pair is directly applied to image sensor control.

FIG. 5 illustrates a system 50 for image capture control. The system 50 comprises an image sensor 51. The image sensor 51 is for example comprised in a camera such as a digital camera. The image sensor may be comprised in a portable electronic camera device. The system 50 comprises further an illumination device 52 arranged to emit a flash so as to illuminate at least a part of a scene while capturing an image of the scene with the image sensor 51. The illumination device 52 may be comprised in the portable electronic camera device. The illumination device may be in wireless communication with the image sensor. The illumination device may for example be formed in another portable electronic camera device.

The system 50 comprises further a control element 53 for controlling image sensor exposure setting. The control element 53 comprises a processor and memory. The processor and memory are arranged to cooperate to control the control element to perform the following.

The control element 53 is arranged to obtain first pre-image data related to a first pre-image captured using a pre-determined first image sensor pre-image exposure setting. The first pre-image is captured using the image sensor 51 while emitting a flash of a predetermined first pre-flash energy using the illumination device 52. The control element 53 may be arranged to control coordination of image capture and flash emission to capture the first pre-image such that the flash is in the captured first pre-image. The first pre-image data comprises characteristically a first set of image sensor pixel values.

The control element 53 is further arranged to obtain second pre-image data related to a second pre-image captured using a predetermined second image sensor pre-image exposure setting. The predetermined second image sensor pre-image exposure setting has a known and predetermined relation to the predetermined first image sensor pre-image exposure setting.

The second pre-image is captured while emitting a flash of a predetermined second pre-flash energy using the illumination device 52 or without emitting a flash. The control element may be arranged to control the image sensor to capture the second pre-image. When the second pre-image data is obtained while illuminating the scene with a flash, the control element 53 may be arranged to control coordination of image capture and flash emission to capture the second pre-image such that the flash is in the captured second pre-image. The second pre-image data comprises characteristically a second set of image sensor pixel values.

The control element is further arranged to determine, based on the first pre-image data and the second pre-image data, a flash affected area in the second pre-image, in which flash affected area a predetermined ratio of the image sensor pixel values have changed from the first pre-image.

The control element 53 is further arranged to determine the image sensor exposure setting for use in capturing the image based on the first and the second sets of image sensor pixel values in the flash affected area, the predetermined first and second image sensor pre-image exposure setting and a relation between a predetermined main flash energy and the energy of the predetermined first pre-flash and possible predetermined second pre-flash, respectively, to obtain a desired exposure of the flash affected area of the image as detected by the image sensor.

The control element may be arranged to forward information relating to the determined image sensor exposure setting to the image sensor. The image sensor 51 is arranged to then adapt its setting so that the image is captured using the determined image sensor exposure setting.

The control element 53 is arranged to receive information relating to the predetermined image sensor pre-image exposure value from the image sensor.

The control element may also be arranged to control a flash power energy and/or flash duration of the flashes. Thus, the control element 53 may be arranged to transmit control information to the illumination device 52 to control the flash power energy and/or flash duration of the flashes.

The control element may be at least partly implemented in an app.

The image sensor 51 may be implemented in a portable electronic camera device, such as a camera phone or tablet. The portable electronic camera device may be arranged to communicate with the at least one remote illumination device 52 via a Bluetooth interface.

Figure 6:
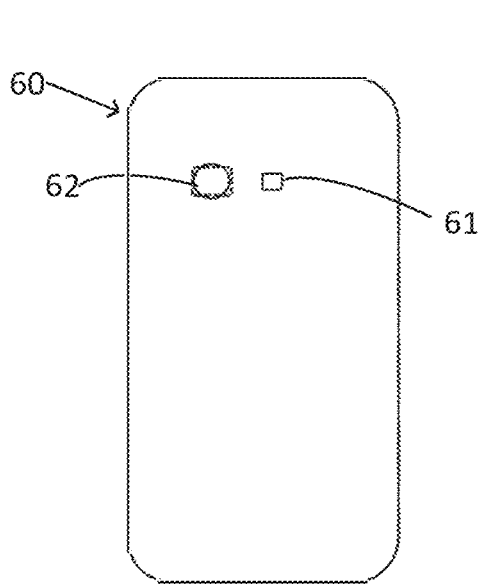
FIG. 6 illustrates an example of a back side of a portable camera device having image capture control functionality.
Figure 7:
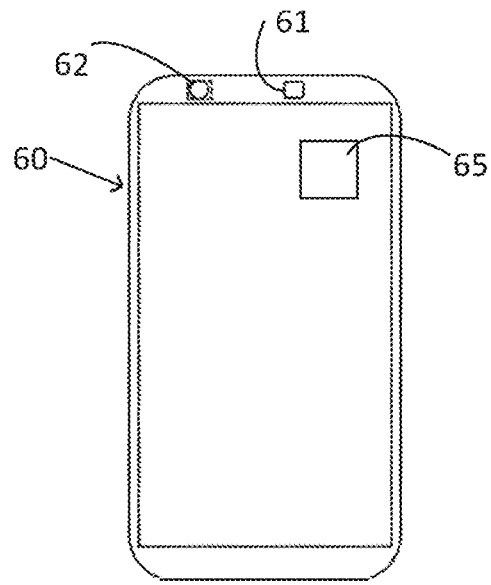
FIG. 7 illustrates an example of a front side of a portable camera device having image capture control functionality.
Figure 8:
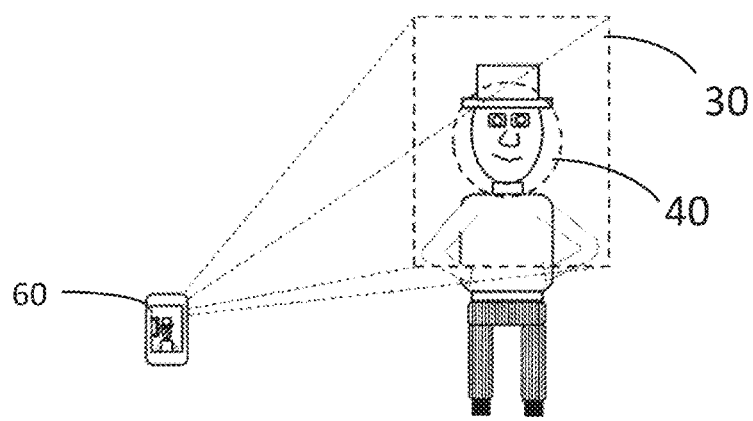
FIG. 8 illustrates an example of use of a portable camera device having image capture control functionality.

FIGS. 6-8 illustrate an application example wherein the system for example as described in relation to FIG. 5 is at least partly implemented in a portable electronic camera device 60. The portable electronic camera device 60 comprises an image sensor 61 to capture an image of a scene and an illumination device 62 configured to emit a flash to illuminate the scene for capture by the image sensor.

In FIG. 6, an example is illustrated wherein the image sensor 61 and illumination device 62 are positioned on a back side of the portable electronic camera device. Further, an additional image sensor and illumination device may be positioned on a front side of the portable electronic camera device 60.

In FIG. 7, an example is illustrated wherein the image sensor 61 and illumination device 62 are positioned on a front side of the portable electronic camera device 60. Further, an additional image sensor and illumination device may be positioned on a back side of the portable camera device 60. Further, in the illustrated example an app 65 is loaded into the portable camera device 60. The app 65 comprises a user interface for the system for image capture control as disclosed herein.

In FIG. 8, the portable camera device 60 is used for capturing an image 30. The captured image comprises a flash affected area 40. Further, an area of interest may also have been identified, for example by means of face recognition. The flash affected area is then characteristically obtained in the area of interest.

Figure 9:
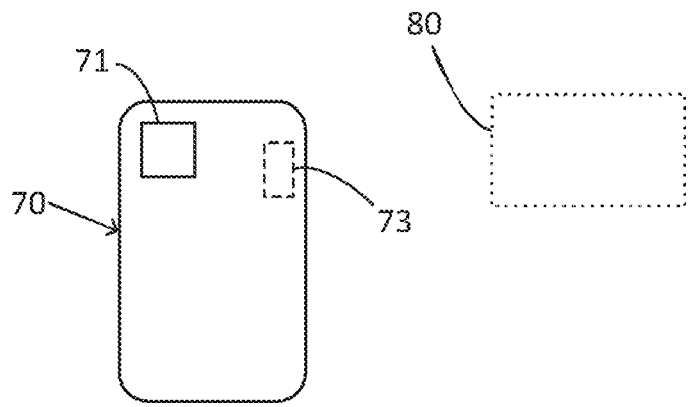
FIG. 9 illustrates an example of a portable camera device having image capture control functionality arranged to communicate with a remote illumination device.

FIG. 9 illustrates an application example wherein the system for example as described in relation to FIG. 5 is at least partly implemented in a portable electronic camera device 70.

In FIG. 9, illustrates an example of a portable electronic camera device 70 comprising the image sensor 71 to capture an image of a scene. The portable electronic camera device 70 further comprises a communication interface 73 configured to communicate with a remote illumination device 80. The remote illumination device 80 may be configured to emit a flash to illuminate the scene for capture by the image sensor 71. In one example, the portable electronic camera device 70 may be configured to communicate with at least one remote illumination device 80. In one example, the portable electronic camera device 70 may be configured to communicate with at least two remote illumination devices 80.

The portable electronic camera device 70 is configured to control the remote illumination device(s) 80. The portable electronic camera device 70 may be arranged to transmit control information to the remote illumination device(s) 80.

The communication interface 73 may be a short range communication interface, such as a Bluetooth interface and/or a Wi-Fi interface.

The communication interface 73 may comprise wired communication.

What is claimed is:

1. A computer implemented method for obtaining an image sensor exposure setting for use in capturing an image using a main flash, said method comprising the steps of:

obtaining a first pre-image data related to a first pre-image captured with an image sensor using a predetermined first pre-image exposure setting, wherein the first pre-image is captured while emitting a flash of a predetermined first pre-flash energy and wherein the first pre-image data comprises a first set of image sensor pixel values, obtaining a second pre-image data related to a second pre-image captured with the image sensor using a predetermined second pre-image exposure setting, wherein the second pre-image is captured while emitting a flash of a predetermined second pre-flash energy different from the first pre-flash energy and wherein the second pre-image data comprises a second set of image sensor pixel values, determining, based on the first pre-image data and the second pre-image data, a flash affected area in the second pre-image in which a predetermined ratio of the image sensor pixel values have changed from the first pre-image, determining whether a predetermined ratio of the image sensor pixel values of at least one of the first set of image sensor pixel values or the second set of image sensor pixel values are within a predetermined range, and when not, repeating the obtaining of at least one of the first pre-image data or the second pre-image data until the at least one of the first set of image sensor pixel values or the second set of image sensor pixel values is obtained wherein the predetermined ratio of the image sensor pixel values are within the predetermined range, or until it is determined that the predetermined range is insufficient for the predetermined ratio of image sensor pixel values, wherein the repeating is performed with adjusted at least one of the first or second pre-flash energy or the first or second pre-image exposure setting, and determining the image sensor exposure setting for use in capturing the image based on the first set and the second set of image senor pixel values in the flash affected area, the predetermined first and second image sensor pre-image exposure setting and a relation between a predetermined main flash energy, the energy of the predetermined first pre-flash and the energy of the predetermined second pre-flash, respectively, so as to obtain a desired exposure of the flash affected area of the image, wherein the step of determining the image sensor exposure setting is made based on at least one of a first data set or a second data set wherein the predetermined ratio of the image sensor pixel values are within the predetermined range.

2. The computer implemented method according to claim 1, at least one of:

wherein, when it is determined that the predetermined range is insufficient, a plurality of first pre-images with different exposure values are used for a combined image, wherein the first set of image sensor pixel values in the combined image is a combination of the image sensor pixel values from different first pre-images, or wherein the repeating is performed until the second set of image sensor pixel values are within the predetermined range, wherein the second set of image sensor pixel values are obtained based on a plurality of obtained second pre-image data.

3. The computer implemented method according to claim 1, further comprising a step of determining whether a predetermined ratio of the image sensor pixel values of one of the first and second sets of image sensor pixel values are within a predetermined range, and when not, using the pixel values of the other set to estimate correct values for those image sensor values which lie outside the predetermined range.

4. The computer implemented method according to claim 1, wherein the desired exposure of the flash affected area in the image relates to an average pixel value of the flash affected area in the image.

5. The computer implemented method according to claim 1, wherein the desired exposure is determined based on the first or second pre-image data captured without emitting a flash.

6. The computer implemented method according to claim 1, further comprising a step of determining at least one area of interest in the image, wherein the flash affected area is obtained in the area of interest and wherein said area of interest is smaller than the image.

7. The computer implemented method according to claim 6, wherein the determination of at least one area of interest in the image is at least one of based on face recognition, in the first or second pre-image, or based on user selection of an area of interest.

8. The computer implemented method according to claim 1, wherein the determination of the image sensor exposure setting comprises selecting at least one of a sensor sensitivity value, a shutter speed value, or an aperture size for the image sensor for use when capturing the image.

9. The computer implemented method according to claim 8, wherein the selection of at least one of the sensor sensitivity value, the shutter speed value, or the aperture size is based on stored data, said stored data relating, for a predetermined number of image sensor exposure settings, each image sensor exposure setting to at least one corresponding sensor sensitivity value and shutter speed value pair, and wherein the selection of at least one of the sensor sensitivity value or the shutter speed value comprises selecting a pair related to the determined image sensor exposure setting.

10. The computer implemented method according to claim 1, further comprising a step of determining a main flash setting.

11. The computer implemented method according to claim 1, further comprises a step of applying the determined image sensor exposure setting or information related thereto to image sensor control.

12. The computer implemented method according to claim 1, wherein the main flash energy is higher than the pre-flash energy.

13. A control element for controlling an image sensor exposure setting, said control element comprising a processor and a memory and being arranged to:

obtain first pre-image data related to a first pre-image captured using a predetermined first image sensor pre-image exposure setting, wherein the first pre-image is captured while emitting a flash of a predetermined first pre-flash energy and wherein the first pre-image data comprises a first set of image sensor pixel values, obtain second pre-image data related to a second pre-image captured using a predetermined second image sensor pre-image exposure setting, wherein the second pre-image is captured while emitting a flash of a predetermined second pre-flash energy different than the first pre-flash energy and wherein the second pre-image data comprises a second set of image sensor pixel values, determine, based on the first pre-image data and the second pre-image data, a flash effected area in the second pre-image in which a predetermined ratio of the image sensor pixel values have changed from the first pre-image, determine whether a predetermined ratio of the image sensor pixel values of at least one of the first set of image sensor pixel values or the second set of image sensor pixel values are within a predetermined range, and when not, repeat the obtaining of at least one of the first pre-image data or the second pre-image data until the at least one of the first set of image sensor pixel values or the second set of image sensor pixel values is obtained wherein the predetermined ratio of the image sensor pixel values are within the predetermined range, or until it is determined that the predetermined range is insufficient for the predetermined ratio of image sensor pixel values, wherein the repeating is performed with adjusted at least one of the first or second pre-flash energy or the first or second pre-image exposure setting, and determine the image sensor exposure setting for use in capturing the image based on the first set and the second set of image senor pixel values in the flash affected area, the predetermined first and second image sensor pre-image exposure setting and a relation between a predetermined main flash energy, the energy of the predetermined first pre-flash and the energy of the predetermined second pre-flash, respectively, so as to obtain a desired exposure of the flash affected area of the image as detected by the image sensor, wherein the control element is arranged to determine the image sensor exposure setting based on at least one of a first data set or a second data set wherein the predetermined ratio of the image sensor pixel values are within the predetermined range.

14. The control element according to claim 13, further arranged to forward information relating to the determined image sensor exposure setting to the image sensor.

15. The control element according to claim 13, further arranged to receive information relating to the predetermined first and second image sensor pre-image exposure settings from the image sensor.

16. The control element according to claim 13, further arranged to control at least one of a flash power or energy or a flash duration of the flashes.

17. A system for image capture control, said system comprising:

an image sensor, at least one illumination device, and a control element according to claim 13 arranged to provide image sensor exposure setting information to the image sensor.

18. A portable electronic camera device comprising an image sensor to capture an image of a scene and an illumination device configured to emit a flash to illuminate the scene for capture by the image sensor, wherein the portable electronic camera device further comprises a control element according to claim 13 arranged to provide image sensor exposure setting information to the image sensor.

19. A portable electronic camera device comprising an image sensor to capture an image of a scene, and comprising a communication interface configured to communicate with a remote illumination device configured to emit a flash to illuminate the scene for capture by the image sensor, wherein the portable electronic camera device is configured to control the remote illumination device, and wherein the portable electronic camera device further comprises a control element according to claim 13 arranged to provide image sensor exposure setting information to the image sensor.

* * * * *